(12) United States Patent
Palermo et al.

(10) Patent No.: US 10,178,054 B2
(45) Date of Patent: Jan. 8, 2019

(54) METHOD AND APPARATUS FOR ACCELERATING VM-TO-VM NETWORK TRAFFIC USING CPU CACHE

(71) Applicant: INTEL CORPORATION, Santa Clara, CA (US)

(72) Inventors: Stephen T. Palermo, Chandler, AZ (US); Iosif Gasparakis, Hillsboro, OR (US); Scott P. Dubal, Beaverton, OR (US); Kapil Sood, Beaverton, OR (US); Trevor Cooper, Portland, OR (US); Jr-Shian Tsai, Portland, OR (US); Jesse C. Brandeburg, Portland, OR (US); Andrew J. Herdrich, Hillsboro, OR (US); Edwin Verplanke, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 48 days.

(21) Appl. No.: 15/088,910

(22) Filed: Apr. 1, 2016

(65) Prior Publication Data

US 2017/0289068 A1    Oct. 5, 2017

(51) Int. Cl.
*H04L 12/861* (2013.01)
*H04L 12/715* (2013.01)
*H04L 12/931* (2013.01)
*G06F 15/173* (2006.01)

(52) U.S. Cl.
CPC .... *H04L 49/9047* (2013.01); *G06F 15/17331* (2013.01); *H04L 45/64* (2013.01); *H04L 49/70* (2013.01)

(58) Field of Classification Search
CPC ..... H04L 49/9047; H04L 45/64; H04L 49/70; G06F 15/17331
See application file for complete search history.

(56) References Cited

U.S. PATENT DOCUMENTS

| | | | |
|---|---|---|---|
| 2014/0219276 A1* | 8/2014 | Jokinen | H04L 47/62 370/392 |
| 2014/0254594 A1* | 9/2014 | Gasparakis | H04L 45/74 370/392 |
| 2015/0370586 A1* | 12/2015 | Cooper | G06F 9/45533 710/308 |
| 2016/0359769 A1* | 12/2016 | Wang | H04L 69/22 |

* cited by examiner

*Primary Examiner* — Lakeram Jangbahadur
(74) *Attorney, Agent, or Firm* — Law Office of R. Alan Burnett, P.S

(57) ABSTRACT

Methods and apparatus for accelerating VM-to-VM Network Traffic using CPU cache. A virtual queue manager (VQM) manages data that is to be kept in VM-VM shared data buffers in CPU cache. The VQM stores a list of VM-VM allow entries identifying data transfers between VMs that may use VM-VM cache "fast-path" forwarding. Packets are sent from VMs to the VQM for forwarding to destination VMs. Indicia in the packets (e.g., in a tag or header) is inspected to determine whether a packet is to be forwarded via a VM-VM cache fast path or be forwarded via a virtual switch. The VQM determines the VM data already in the CPU cache domain while concurrently coordinating with the data to and from the external shared memory, and also ensures data coherency between data kept in cache and that which is kept in shared memory.

22 Claims, 9 Drawing Sheets

METHOD AND APPARATUS FOR ACCELERATING VM-TO-VM NETWORK TRAFFIC USING CPU CACHE

BACKGROUND INFORMATION

Today's Data Centers handle geographically dispersed data. In a virtualized environment the networking resources are shared among one or more virtual machines (VMs). Although no physical network is present, virtual networks still require network traffic handling at the packet level. Packets are routed according to their destination address using software just as if actual hardware was used. VM applications transmit and receive network traffic just as they were based on a physical host. In virtualized environments virtual switches or bridges are used for forwarding traffic between virtual machines and VM to physical networks through network interface cards (NICs). Virtual switch (vSwitch) and virtual bridge implementations vary (e.g., software hypervisor implementations, hardware as a virtual embedded switch in a NIC as well as virtual switch acceleration in a NIC to assist the software switch or bridge). VMs are connected to virtual switches using a virtual NIC (vNIC) implemented in either hypervisor software or provided by hardware in physical NICs.

Network Interface controllers that provide hardware virtualization of network interfaces mostly use single root IO (Input/Output) virtualization (SR-IOV) technology to provide multiple logical network interfaces to share one physical network interface (NIC) card. A physical function (PF) driver running in the host OS is used to configure the NIC hardware.

One or more PCIe (Peripheral Component Interconnect Express) Virtual Functions (VFs) are associated with the NIC which are attached to the NIC's PF. Each VF shares one or more physical resources of the NIC (e.g., memory and a network port) with the PF and other VFs supported on the device. Network traffic is kept separate using an IO memory management unit (IOMMU) to direct different data streams to and from VFs that are ultimately tied to different VMs. SR-IOV therefore enables traffic to bypass switches implemented by software (i.e., vSwitch). This allows network traffic to flow directly from the NIC VF to a particular VM without the extra burden imposed by software switching.

Service Function Chaining (SFC) provides the ability to define an ordered list of a network services (e.g., data compression, security, inspection, firewalls, load balancers). These services are typically implemented as Service Functions (SF) deployed in separate VMs because different services require different applications sometimes running on different operating systems. A SFC is "stitched" together in the network to create a chain of operations that perform processing on a data stream or individual packet.

Current software or hardware approaches for VM-to-VM forwarding are sufficient for traditional enterprise or cloud computing environments where direct NIC-to-VM hardware access is a common usage. However for emerging software defined network (SDN) virtualization usage models in enterprise, cloud and Telecommunication (Telco) networks, VM-to-VM access is also significant because certain virtual network functions (VNFs) (e.g., proxy, firewall, router) require multi-stage packet processing typically handled by different applications sometimes on different operating systems handled by different VMs.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified.

DETAILED DESCRIPTION

Figure 1:
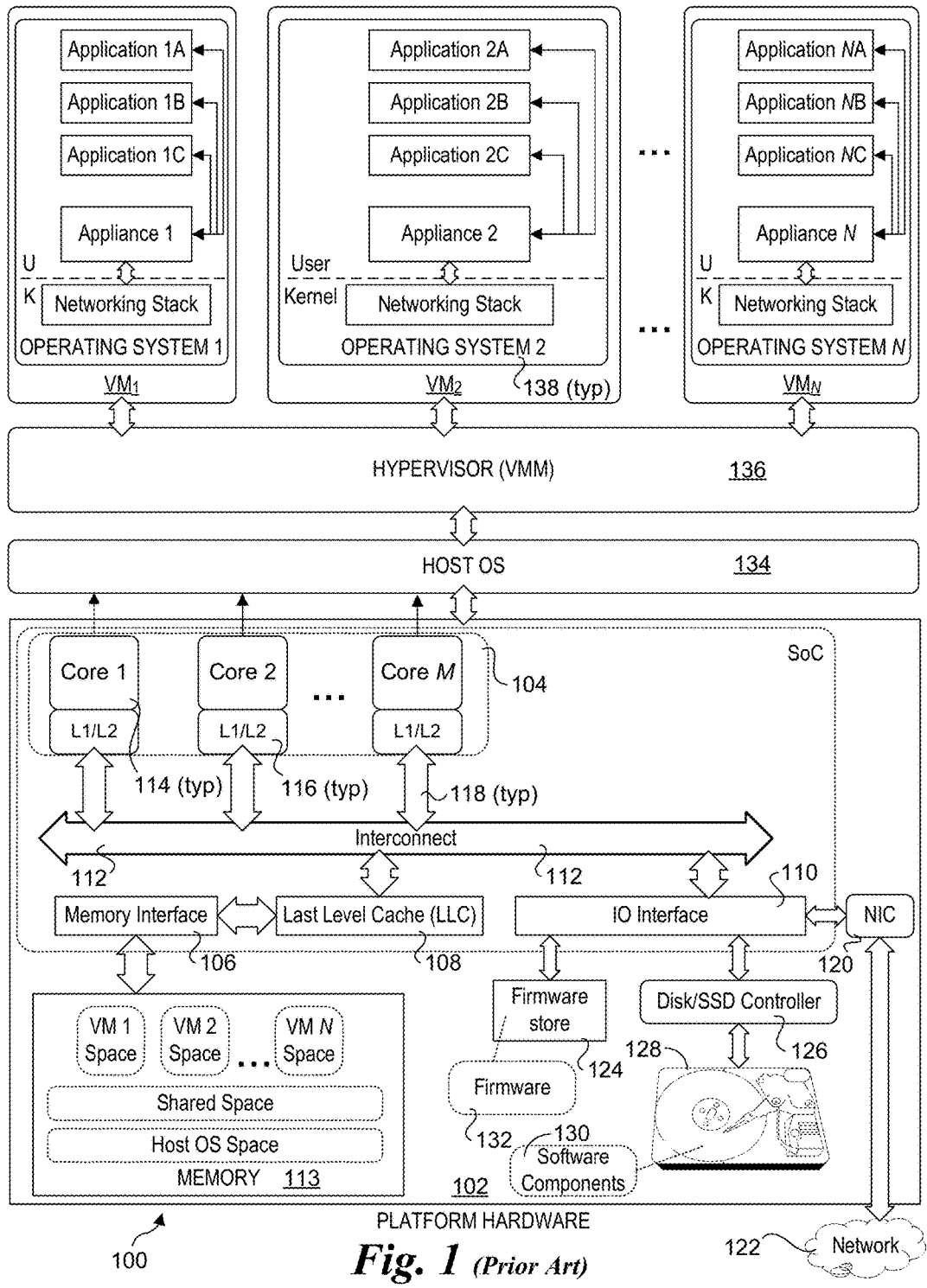
FIG. 1 is a schematic diagram illustrating an exemplary host platform configuration including platform hardware and various software-based components including NFV components.

Embodiments of methods and apparatus for accelerating VM-to-VM Network Traffic using CPU cache are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

For clarity, individual components in the Figures herein may also be referred to by their labels in the Figures, rather than by a particular reference number. Additionally, reference numbers referring to a particular type of component (as opposed to a particular component) may be shown with a reference number followed by "(typ)" meaning "typical." It will be understood that the configuration of these components will be typical of similar components that may exist but are not shown in the drawing Figures for simplicity and clarity or otherwise similar components that are not labeled with separate reference numbers. Conversely, "(typ)" is not to be construed as meaning the component, element, etc. is typically used for its disclosed function, implement, purpose, etc.

As used herein, the terms "virtual appliance," "virtual network appliance," "network appliance," or simply "appliance" may be used interchangeably. In addition, for the purpose herein, including the claims, any software-based appliance relating to Software Defined Networking or configured to implement Network Function Virtualization may more generally be referred to as a "virtual appliance," with the understanding that virtual network appliances include any network appliance or virtualized entity that is configured to implement Network Function Virtualization and/or operations relating to Software Defined Networking. Accordingly, the terms virtual appliance in the following description includes all NFV appliances, as well. Additionally, the terms "cacheline" and "cache line" may also be used interchangeably.

To have a better understanding of the operations and advantages of the embodiments described below, a brief primer on SDN and NFV is first discussed. FIG. 1 shows an exemplary host platform architecture 100 including platform hardware 102 and various software-based components including NFV components. Platform hardware 102 includes a central processing unit (CPU) 104 coupled to each of a memory interface 106, a last level cache (LLC) 108 and an input/output (IO) interface 110 via an interconnect 112. In some embodiments, all or a portion of the foregoing components may be integrated on a System on a Chip (SoC). Memory interface 106, also referred to as a memory controller, is configured to facilitate access to system memory 113, which will usually be separate from (external to) the CPU or SoC, and may also be referred to herein as external memory.

CPU 104 includes a core portion including M processor cores 114, each including a local level 1 (L1) and level 2 (L2) cache (shown as a combined L1/L2 cache 116). Optionally, the L2 cache may be referred to as a "middle-level cache" (MLC). As illustrated, each processor core 114 has a respective connection 118 to interconnect 110 and operates independently from the other processor cores.

For simplicity, interconnect 110 is shown as a single double-ended arrow representing a single interconnect structure; however, in practice, interconnect 110 is illustrative of one or more interconnect structures within a processor or SoC, and may comprise a hierarchy of interconnect segments or domains employing separate protocols and including applicable bridges for interfacing between the interconnect segments/domains. For example, the portion of an interconnect hierarchy to which memory and processor cores are connected may comprise a coherent memory domain employing a first protocol, while interconnects at a lower level in the hierarchy will generally be used for IO access and employ non-coherent domains. The interconnect structure on the processor or SoC may include any existing interconnect structure, such as buses and single or multi-lane serial point-to-point, ring, or mesh interconnect structures.

IO interface 110 is illustrative of various IO interfaces provided by platform hardware 102. Generally, IO interface 110 may be implemented as a discrete component (such as IO subsystem hub or the like), or it may be implemented on an SoC and referred to as an integrated IO (IIO) interface. Moreover, IO interface 110 may also be implemented as an IO hierarchy, such as a Peripheral Component Interconnect Express (PCIe™) IO hierarchy. IO interface 110 further facilitates communication between various IO resources and devices and other platform components. These include a NIC 120 that is configured to facilitate access to a network 122, and various other IO devices, which include a firmware store 124, a disk/SSD controller 126, and a disk drive 128. More generally, disk drive 128 is representative of various types of non-volatile storage devices, including both magnetic- and optical-based storage devices, as well as solid-state storage devices, such as solid state drives (SSDs) or Flash memory.

The multiple cores 114 of CPU 104 are employed to execute various software components 130, such as modules and applications, which are stored in one or more non-volatile storage devices, such as depicted by disk drive 128. Optionally, all or a portion of software components 130 may be stored on one or more storage devices (not shown) that are accessed via a network 122.

During boot up or run-time operations, various software components 130 and firmware 132 are loaded into system memory 113 and executed on cores 114 as processes comprising execution threads or the like. Depending on the particular processor or SoC architecture, a given "physical" core may be implemented as one or more logical cores, with processes being allocated to the various logical cores. For example, under the Intel® Hyperthreading™ architecture, each physical core is implemented as two logical cores.

Under a typical system boot for platform hardware 102, firmware 132 will be loaded and configured in system memory 113, followed by booting a host operating system (OS) 138. Subsequently, a hypervisor 136 (or VMM), which may generally comprise an application running on host OS 134, will be launched. Hypervisor 136 may then be employed to launch various virtual machines, $VM_{1-N}$, each of which will be configured to use various portions (i.e., address spaces) of system memory 113. In turn, each virtual machine $VM_{1-N}$ may be employed to host a respective operating system $138_{1-N}$. Optionally, a type-1 hypervisor architecture may be employed. Under a type-1 hypervisor architecture, the hypervisor runs directly on the physical hardware without requiring an operating system.

During run-time operations, hypervisor 136 enables reconfiguration of various system resources, such as system memory 113, cores 114, and disk drive(s) 128. Generally, the virtual machines provide abstractions (in combination with hypervisor 136) between their hosted operating system and the underlying platform hardware 102, enabling the hardware resources to be shared among $VM_{1-N}$. From the viewpoint of each hosted operating system, that operating system "owns" the entire platform, and is unaware of the existence of other operating systems running on virtual machines. In reality, each operating system merely has access to only the resources and/or resource portions allocated to it by hypervisor 136.

As further illustrated in FIG. 1, each operating system includes a kernel space and a user space, both of which are implemented as memory spaces in system memory 113. The kernel space is protected and used to run operating system kernel components, including a networking stack. Optionally, the networking stack will be in the user space. Meanwhile, an operating system's user space is used to run user applications, as depicted by Appliances 1, 2, and N, and Applications 1A-C, 2A-C, and NA-C.

Generally, Appliances 1, 2, and N are illustrative of various SDN or NFV appliances that may run on virtual machines on platform hardware 102. For simplicity, each $VM_{1-N}$ is depicted as hosting a similar set of software applications; however, this is merely for illustrative purposes, as the VMs for a given platform may host similar applications, or may host different applications. Similarly, each VM$_{1-N}$ may host a single virtual network appliance (as shown), may host multiple virtual network appliances, or may not host any virtual network appliances.

Under SDN on a virtualized platform, data is passed between VMs over a virtual network. Generally, this may be implemented via virtual NICs for each VM, and a virtual switch implemented by the hypervisor or VMM. Under a non-optimized conventional approach, the virtual switch is actually implemented in a manner similar to a physical switch, meaning the virtual switch includes input and output buffers and performs various packet flow operations. As with a physical switch, there are latencies that occur with each step of the data transfer sequence between the virtual NICs, which results in a substantial downgrade in performance.

In a virtualized environment including multiple VMs hosted on the same physical machine, the medium of communication is the memory subsystem. Therefore, expecting a very high throughput performance from the linkage of these VMs is not unrealistic. However, measurements from VMs on a typical modern server using a multitude of virtualization software reveals that the inter-VM communication performance is nowhere near what the memory subsystem could potentially achieve in terms of data throughput. For example, enterprise workloads usually achieve a packet transfer rate on the order of one million packets per second between two VMs. Telco workloads, which typically use highly optimized software stacks and libraries, can usually achieve packet transfer rates on the order of ten million packets per second between two VMs.

Figure 2:
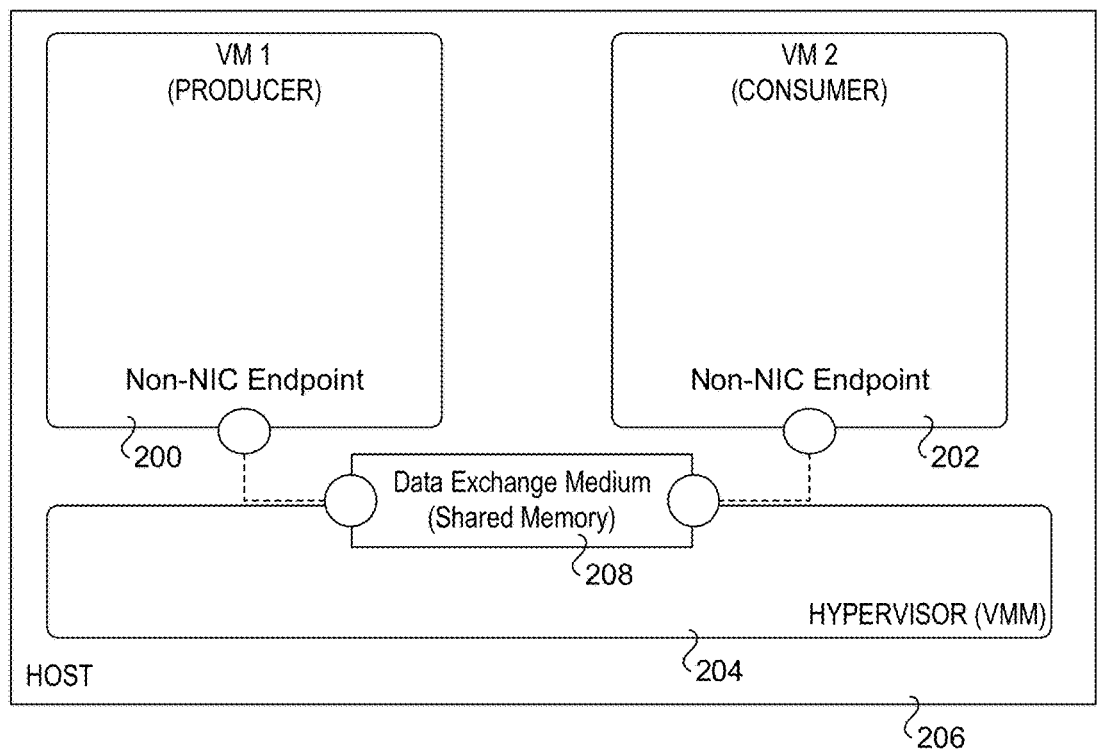
FIG. 2 is a schematic diagram illustrating a producer-consumer model employing shared memory.

The most efficient inter-VM solutions currently in the art rely on shared memory as the data medium for packet communication, as shown in FIG. 2, which depicts a pair of VMs 200 and 202 and a hypervisor 204 running on a host platform 206. VM 200 is a producer, which writes a packet into the shared memory, data exchange medium 208, while VM 202 is a consumer that reads the packet from the shared memory. In order to keep data correctness and integrity, there are some multi-thread synchronization techniques (such as mutexes, spinlocks, lockless queues etc.) that are also being deployed.

In accordance with aspects of the embodiments disclose herein, techniques are provided for reducing the latency of network communication between VMs or virtual functions (VFs) that are handling services that span across multiple VMs and/or VFs on the same platform. The embodiments reduce latency of data flow between VMs using internal CPU cache to locally store data while concurrently transmitting and receiving network data; the transfer path is referred to herein as VM-to-VM cache fast path. At the same time the embodiments greatly reduce the CPU cycles required to push packets from one VM to another.

One non-limiting exemplary use of the VM-to-VM cache fast path is for "Local Service Chaining" (LSC) of virtual network appliances used to facilitate NFV functionality, which is used herein to describe a flow of packets traversing a network that is internal to a host platform under which the packets are processed by a series of network service elements (e.g., virtual network appliances) implemented in multiple virtual machines or virtualized containers.

Figure 3:
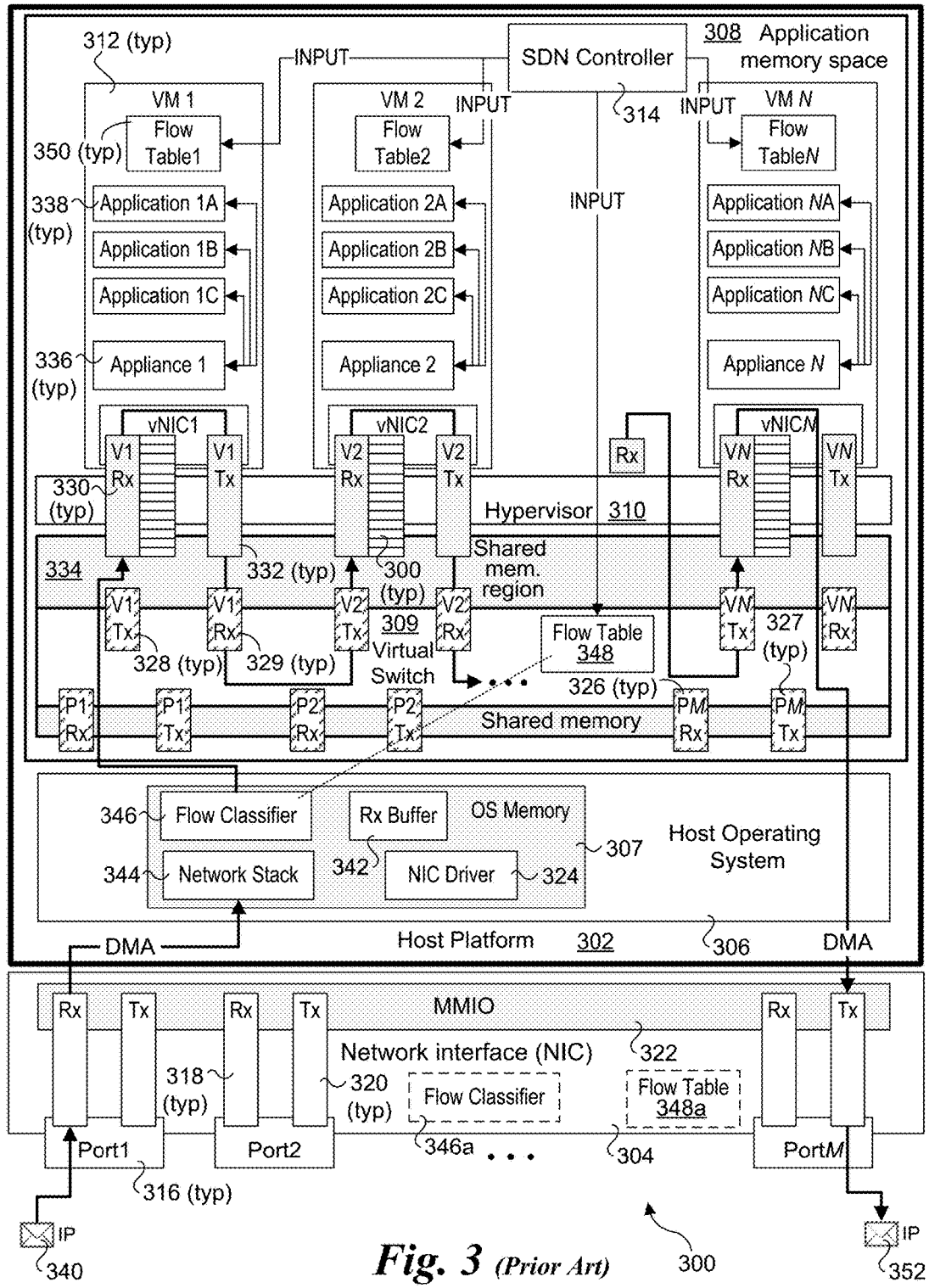
FIG. 3 is schematic diagram illustrating an architecture including virtual machines for an exemplary host platform configured to perform packet processing operations through the use of local service chaining.

By way of example and without limitation, FIG. 3 shows an architecture 300 for a host platform (e.g., compute platform such as a server) configured to perform packet processing operations through the use of LSC. Architecture 300 includes a host platform 302 coupled to a network interface 304 that may be integrated on the host platform (e.g., as a NIC) or otherwise operatively coupled to the host platform (e.g., as a PCIe (Peripheral Component Interconnect Express) NIC card installed in a PCIe expansion slot). Host platform 302 includes a host operating system (OS) 306 running in OS memory 307 that is configured to host multiple applications running in an application memory space 308, which are depicted above host OS 306. This includes a virtual switch 309 and a hypervisor 310 that is configured to host N virtual machines 312, as depicted by virtual machines labeled VM 1, VM 2 and VM N. The software components further include an SDN controller 314.

Network interface 304 includes M network ports 316 labeled Port1, Port2 . . . PortM, where M may be the same or different from N. Each network port 316 includes a receive (Rx) buffer 318 and a transmit (Tx) buffer 320. As used in the Figures herein, the Rx and Tx buffers and Rx and Tx queues that are depicted also may represent co-located Rx and Tx ports; to reduce clutter the Rx and Tx ports are not shown separately, but those skilled in the art will recognize that each Rx and Tx port will include one or more Rx and Tx buffers and/or queues.

Generally, a network interface may include relatively small Rx and Tx buffers that are implemented in the Rx and Tx ports, and then larger Rx and Tx buffers that may be implemented in IO memory on the network interface that is shared across multiple Rx and Tx ports. In the illustrated example, at least a portion of the IO memory is memory-mapped IO (MMIO) 322 that is configured by a NIC driver 324 in OS memory 307 of host OS 306. MMIO 322 is configured to support direct memory access (DMA) data transfers between memory buffers in MMIO 322 and buffers in system memory on host platform 302, as describe in further detail below.

Virtual switch 309 is a software-based entity that is usually configured by an SDN controller or orchestrator to perform switching operations between virtual machines 312 and/or physical network interfaces 304 in host platform 302. In the illustrated example, virtual switch 309 includes a virtual Rx and Tx port for each physical Rx and Tx port on network interface 304 (e.g., for each of Port1-PortM), and a virtual Rx and Tx port for each of virtual machines VM 1-VM N. The virtual ports on the network interface side are depicted as Rx virtual ports 326 and Tx virtual ports 327, while the virtual ports on the VM side are depicted as Rx virtual ports 328 and Tx virtual ports 329. As further shown, a portion of each of Rx and Tx virtual ports 326, 327, 328, and 329 are depicted as overlapping a shared memory region 334 of the system memory address space (also referred to as a shared address space). Additionally, pairs of Rx and Tx virtual ports 330 and 332 are further depicted as extending into a respective virtual NIC (vNIC), as shown by vNIC1, vNIC2 and vNICN, wherein the vNICs are associated with respective virtual machines VM 1, VM 2 and VM N.

Each of virtual machines VM 1, VM 2, and VM N is shown including a virtual appliance 336 and three applications 338 with indicia identifying the corresponding VM the virtual appliance and applications are running on in a similar manner to that shown in FIG. 1 and discussed above. During operation of host platform 302, each of virtual appliances 336 is configured to perform one or more packet-processing services. Moreover, the packet-processing services are implemented in a chained manner as defined by the applicable LSC for the packet flow associated with each packet.

FIG. 3 further shows an exemplary flow path for an Internet Protocol (IP) packet 340 received from an external network at Port1. Packet 340 is buffered in an Rx buffer 318 and DMA'ed to an Rx buffer 342 in OS memory 307, where an initial set of packet processing operations is performed by software components in a network stack 344 and a flow classifier 346, which performs flow classification. IP packet 340 is forwarded via a memory copy operation to the V1 Rx port on vNIC1 for VM 1 and stored in a FIFO buffer. The packet is subsequently processed by Appliance 1, and then forwarded to VM 2 to be processed by Appliance 2, the next virtual appliance in the LSC. To forward the packet, the packet is first put in vNIC1's V1 Tx port and sent to virtual switch 309, where it is received at the V1 Rx port on the virtual switch and switched internally using a lookup of flow table 348 to be sent outbound from the virtual switch's V2 Tx port to be received at the V2 Rx port on vNIC2. After being processed by Appliance 2, the packet will be forwarded to the VM hosting the next virtual appliance in the LSC, which again requires the packet to be switched through virtual switch 309. After the last packet processing operation is performed by Appliance N, the packet is DMA'ed to the Tx port on PortM of NIC 304, as depicted by a processed IP packet 352.

Figure 4:
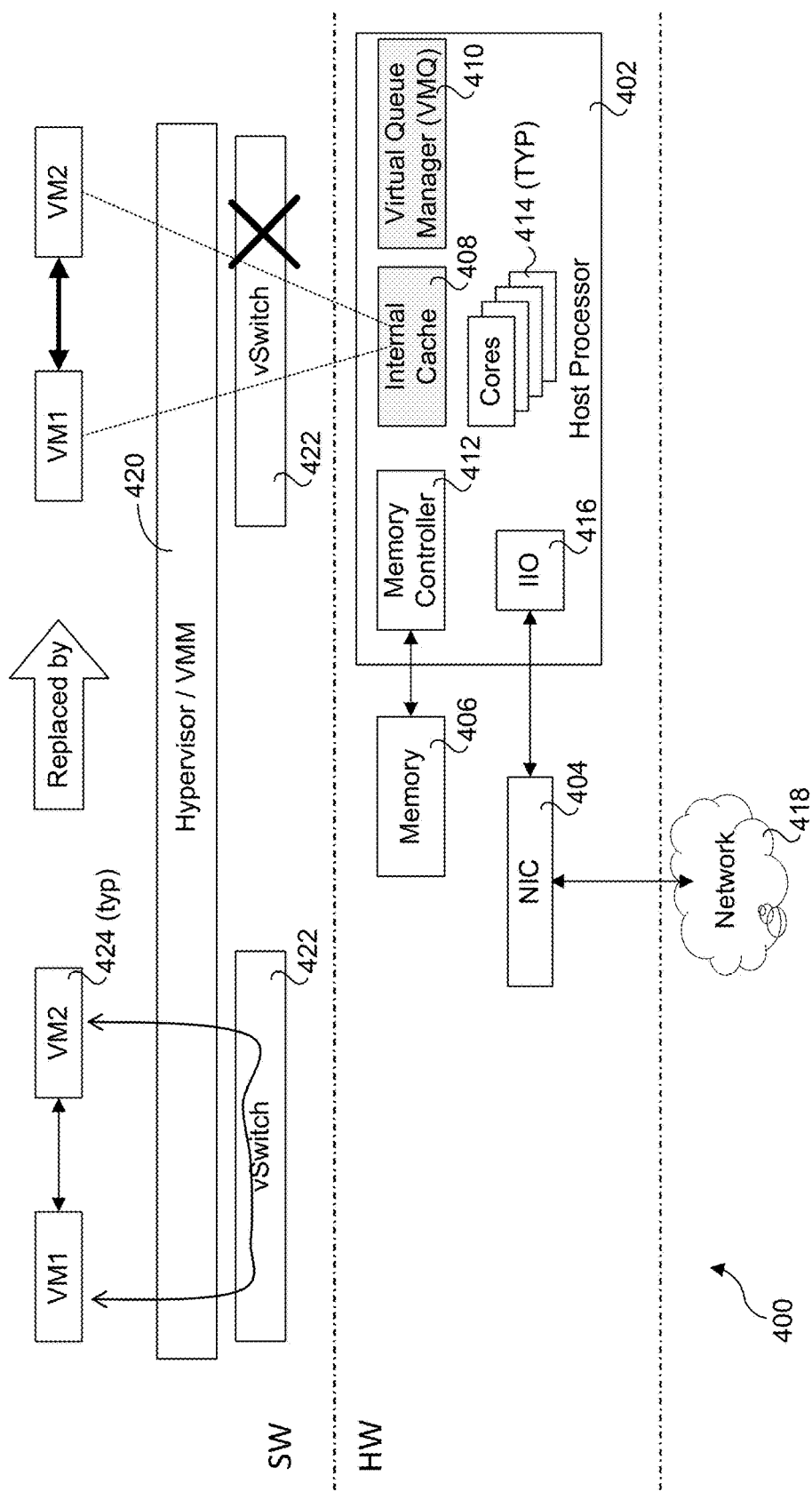
FIG. 4 is a schematic diagram illustrating a comparison between a conventional VM-to-VM communication path that traverses a vSwitch, and a reduced latency VM-to-VM cache fast path, according to one embodiment.

FIG. 4 illustrates a comparison between the conventional VM-to-VM communication path through a virtual switch, and the reduced latency path facilitated by the VM-to-VM cache fast path on a platform architecture 400. The platform architecture is a simplified version of platform architecture 100 of FIG. 1 and has a hardware (HW) layer including a host processor 402 coupled to a NIC 404 and memory 406. Host processor 402 includes internal cache 408, a virtual queue manager (VQM) 410, a memory controller 412 operatively coupled to memory 406, multiple cores 414, and an integrated input/output (IIO) block 416 coupled to NIC 404. Optionally, a host processor may be coupled to an IO subsystem hub or the like implemented in a separate chip (see FIG. 5) that includes IO interfaces for interfacing to various platform devices, such as MC 404. NIC 404 is depicted as coupled to a Network 418, and is configured to receive and transmit network traffic as packetized data. The software (SW) components of platform architecture 400 include a hypervisor or VMM 420, a virtual switch (vSwitch) 422, and multiple VMs 124 including VM1 and VM2.

Under the conventional approach depicted on the left, a communication (e.g., transfer of packets) between VM1 and VM2 is forwarded via vSwitch 422. In contrast, as depicted toward the right, under the VM-to-VM cache fast path approach, communications between VM1 and VM2 are directly passed between memory buffers in internal cache 408, without traversing vSwitch 422.

Figure 5:
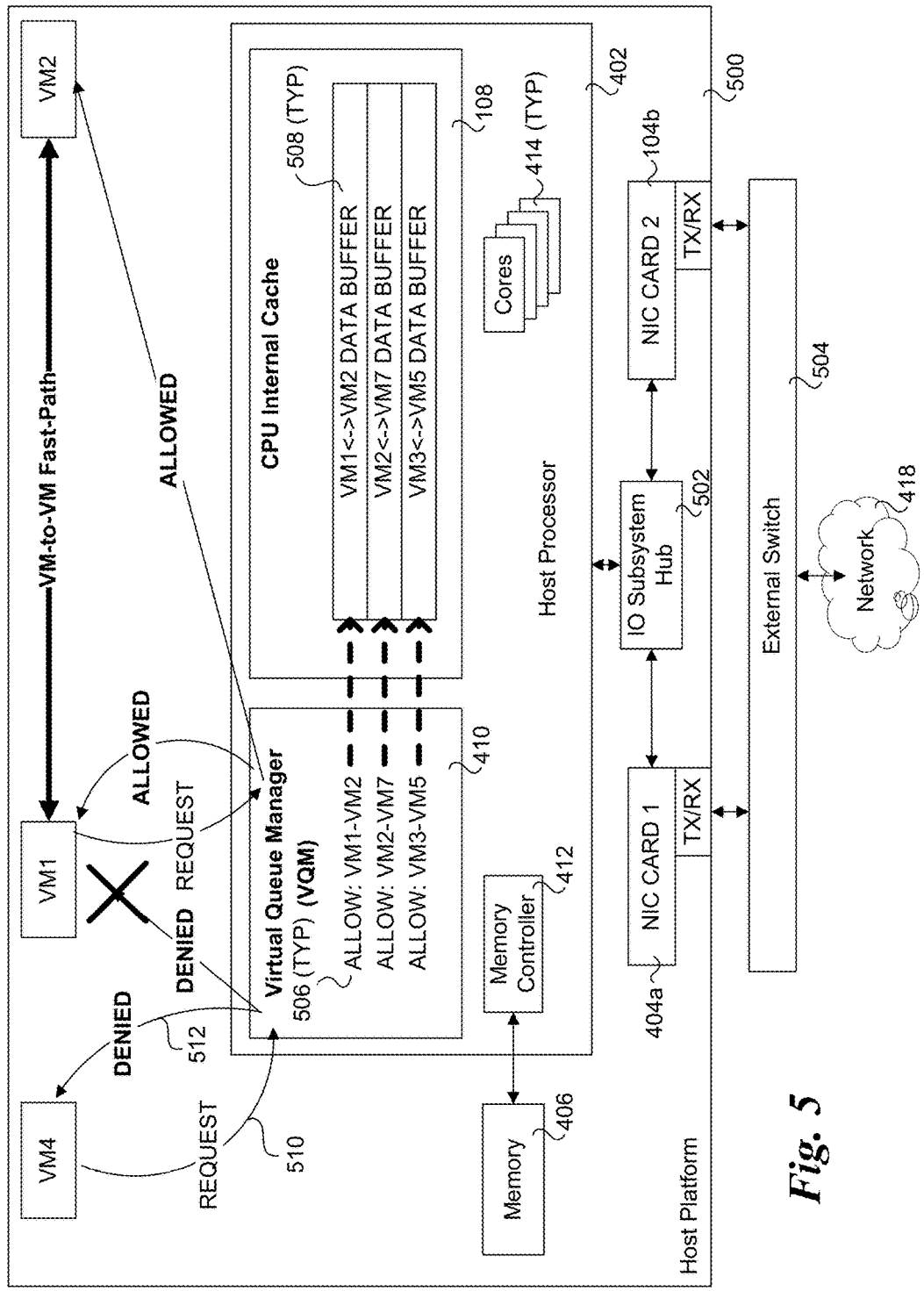
FIG. 5 is a schematic diagram illustrating a host platform configured to support VM-to-VM cache fast path communication, according to one embodiment.

FIG. 5 shows a host platform 500 configured to support VM-to-VM cache fast path communication. Host platform includes a CPU 402 coupled to a IO subsystem hub 502, which in turn is coupled to a pair of NIC Cards 404a and 404b. As before, memory controller 412 is coupled to memory 406. Each of NIC Cards 404a and 404b are coupled to an external switch 504 that is connected to network 118.

VQM 410 is a new component that is integrated on host processor 402, while internal cache 408 is a simplified representation of one of more cache levels on host processor 402. For example, in one embodiment that cache levels include L1 and L2 caches that are private to each of cores 414, and an L3 or last level cache (LLC) that is shared among the cores. Processors may employ other cache architectures, as well, such as but not limited to two cache levels and four cache levels, with the LLC always being the outermost (last) cache level. According to further aspects, the multiple cache levels are configured to implement a coherent memory domain that further includes memory controller 412 and memory 406 using one or more well-known coherency protocols, such as but not limited to (M)odified (E)xclusive (S)hared (I)nvalid (MESI) for a single-processor platform or MESI+(F)orwarded (MESIF) for cache coherent non-uniform memory architectures (NUMA).

In the illustrated embodiment, the VM-to-VM cache fast path is facilitated through the use of multiple VM-VM "allow" entries 506 in VQM 410, and associated VM shared data buffers 508 in internal cache 408. Each VM-VM allow entry 506 will identify a pair of VMs for which the VM-to-VM cache fast path is configured and allowed. It will also point to a corresponding VM shared data buffer 508 in internal cache 408 used to buffer the VM-to-VM packet data.

According to one implementation, the VQM determines what data is to be kept in local cache based on a policy established by a Data Center Node Manager or NFV orchestrator (not shown). The VQM can make decisions on a packet-by-packet basis based on tag data contained in pretagged packets. Tagging packets based on VM session IDs is a known capability and can be accomplished by modifying the packet metadata. For VMs not designated as eligible for fast-path communications, the VQM utilizes shared memory just as would be the case if no CPU cache mechanism were present.

Under one embodiment, when an application running on a VM wants to send data to an application running on another VM, it sends a network packet out of the VMs vNIC and the VM will determine if this is the first time that particular VM wants to establish a connection to the second. If it is the first time, the VM establishing the connection will send a request to the VQM, such as depicted by exemplary requests 510 and 512 sent from VM4 and VM2 to VQM 410, respectively. In one embodiment, the VM-VM allow entries 506 will be managed by the Data Center Node Manager or NFV orchestrator, which will also broadcast this information to the VMs (or to a hypervisor, which in turn updates its VM configuration information). If a VM-to-VM cache fast path between a particular source and destination pair of VMs has not been set up (isn't among the VM-VM entries 506) a request may be denied. An exemplary denied request 514 is shown in FIG. 5. In situations under which there is VM-VM allow entry 506 corresponding to the source and destination VMs, transfer via VM-to-VM cache fast path is allowed, as depicted by an allowed transfer 516.

Figure 6:
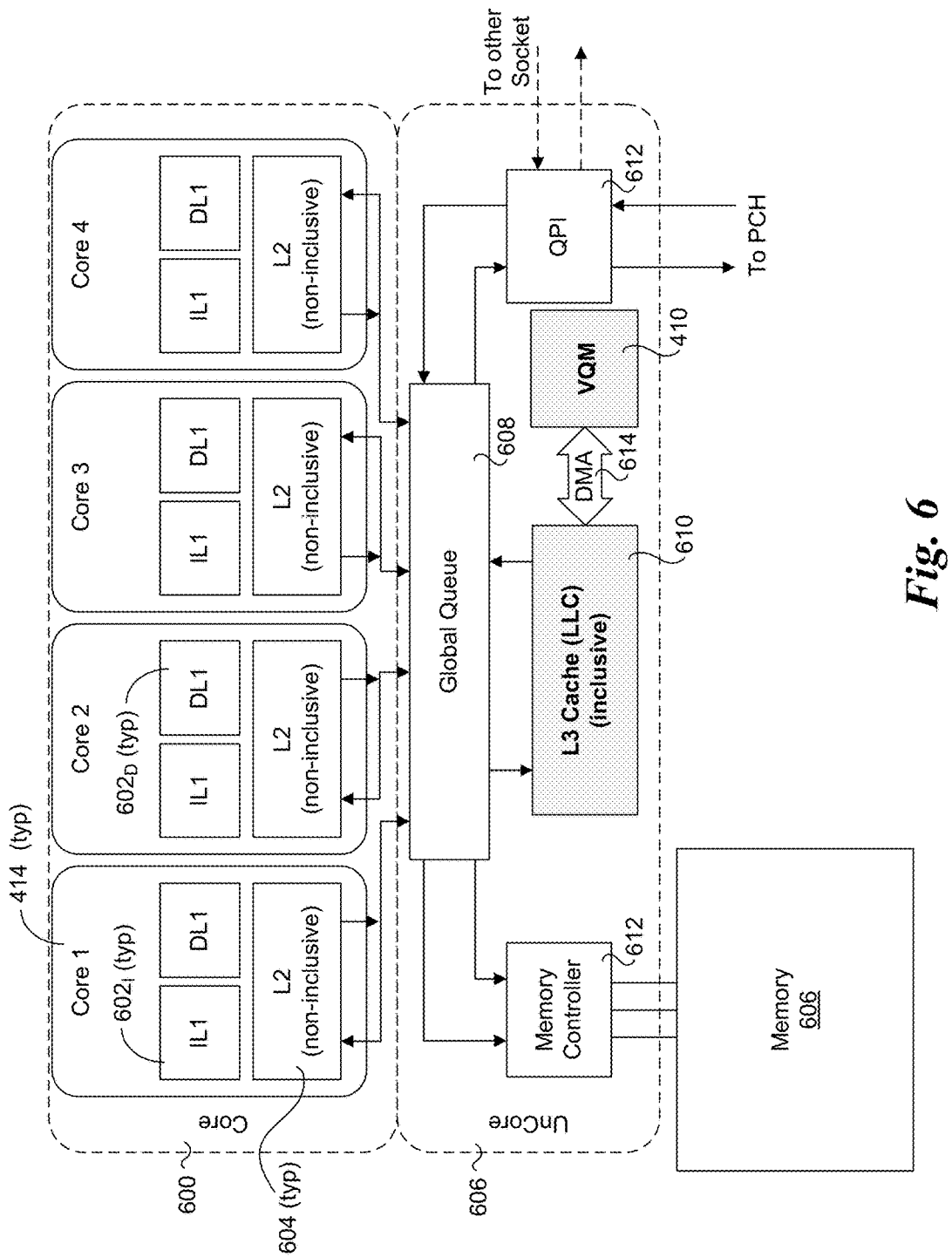
FIG. 6 is a schematic diagram of a multi-level cache hierarchy, according to one embodiment.

FIG. 6 shows an abstracted view of a memory coherency architecture employed by embodiments described herein. Under this and similar architectures, such as employed by many Intel® processors, the L1 and L2 caches are part of a coherent memory domain under which memory coherency is managed by coherency mechanisms in the processor core 600. Each core 114 includes an L1 instruction (IL1) cache 602$_1$, an L1 data cache (DL1) 602D, and an L2 cache 604.

Meanwhile, the LLC is considered part of the "uncore" 606, wherein memory coherency is extended through coherency agents (see FIG. 7 below). As shown, uncore 606 includes memory controller 412 coupled to external memory 406 and a global queue 608. Global queue 608 also is coupled to an L3 cache 610, and a QuickPath Interconnect® (QPI) interface 612. Optionally, interface 612 may comprise a Keizer Technology Interconnect (KTI) or Universal Path interconnect (UPI) interface. In a multi-socket platform, interface 612 is used to transfer data between sockets.

L2 caches 604 are depicted as non-inclusive, meaning they do not include copies of any cachelines in the L1 instruction and data caches for their respective cores. As an option, L2 may be inclusive of L1, or may be partially inclusive of L1. L3 cache 610 (which functions as the LLC in this architecture) is inclusive, meaning that it includes is a copy of each cacheline in the L1 and L2 caches. Optionally, L3 may be non-inclusive of L2. As yet another option, L1 and L2 may be replaced by a cache occupying a single level in the cache hierarchy.

As further shown in FIG. 6, VQM 410 is connected to L3 cache 610 via a DMA interface 614. VQM 410 is also enabled to communicate with the cache coherency agents to coordinate data transfers between the multiple cache levels and system memory in a manner that supports memory coherency.

Figure 7:
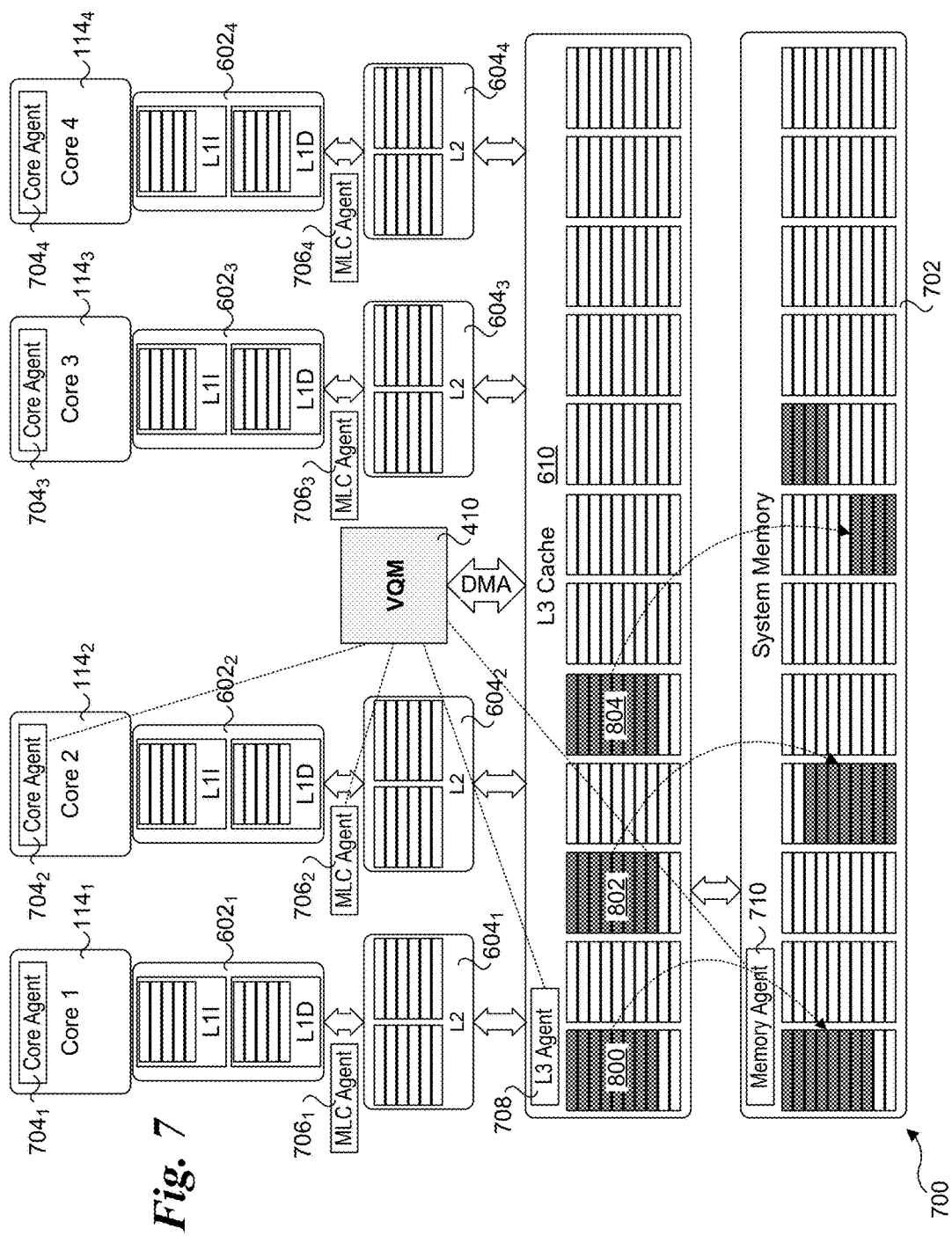
FIG. 7 is a schematic diagram illustrating another view of the multi-level cache hierarchy of FIG. 6.

FIG. 7 shows one embodiment of a cache hierarchy 700 including a VQM 410 that supports VM-to-VM cache fast path data transfers in a coherent memory domain including system memory 702. Each of cores $414_1$-$414_4$ include a respective core agent $704_1$-$704_4$ and is respectively coupled to an L1 cache $602_1$-$602_4$. The L1 caches, in turn, are coupled to a respective L2 cache $604_1$-$604_4$, each of which is operatively coupled to L3 cache 610. (To avoid clutter, global queue 408 is not shown FIG. 7 but is part of the cache hierarchy in one embodiment.)

Cache hierarchy 700 includes memory coherency agents at multiple levels, including core agents 704 that are used for data transfers into and out of associated L1 caches 602, middle level cache (MLC) agents 706 that are used for data transfers into and out of associated L2 caches 604, an L3 agent 708 that is used for data transfers into and out of L3 cache 610, and a memory agent 710 that is used for data access to system memory 702. These agents are also responsible for associate memory coherency operations, which includes, in one embodiment, marking cache lines to have an associated state (e.g., M, E, S, or I or M, E, S, I or F).

Figure 8:
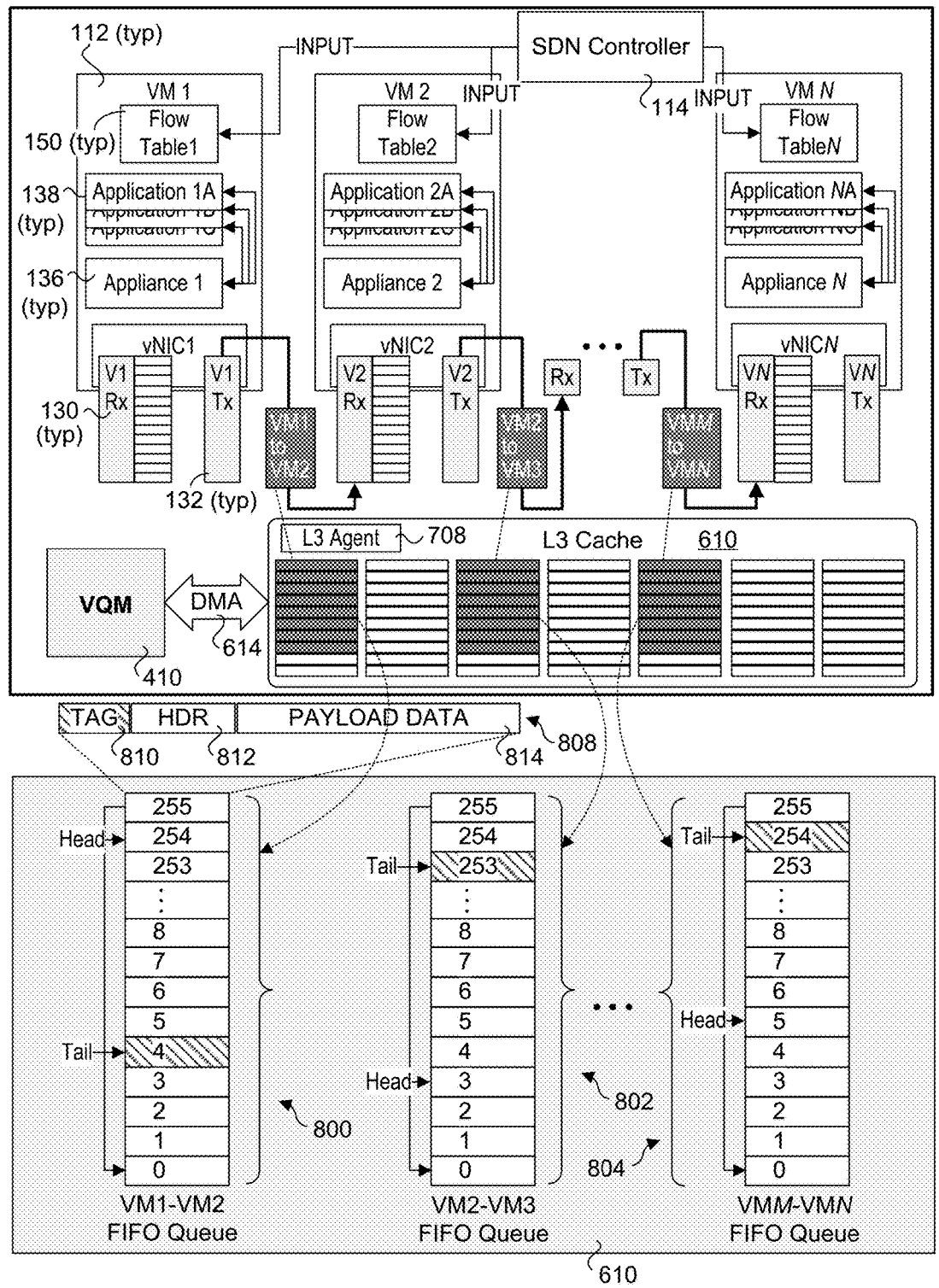
FIG. 8 is a schematic diagram illustrating the use of VM-VM shared buffer implemented as FIFO Queues.

FIG. 8 shows further details of VM shared data buffers 508 and their usage in supporting VM-to-VM cache fast path communication, according to one embodiment. In this example there are three VM shared data buffers for the following associated VM-to-VM cache fast paths: VM1-to-VM2; VM2-to-VM3; and VMM-to-VMN. In the illustrated embodiment, each VM shared data buffer is implemented as a circular FIFO Queue, as depicted by VM1-VM2 FIFO Queue 802, VM2-VM3 FIFO Queue 804, and VMM-VMN FIFO Queue 806. For illustrative purposes, the size of each FIFO Queue is 256 slots; however, this is merely exemplary, as the FIFO Queues may have any suitable size. Moreover, the sizes of different FIFO Queues may differ.

The VM1-to-VM2, VM2-to-VM3 and VMM-to-VMN cache fast paths are shown in the upper portion of FIG. 8. For illustrative purposes, they are shown connecting a Tx port on a sending vNIC to an Rx port on the receiving vNIC, as if there is a data transfer path. However, from an operational standpoint the sending VM's Tx port and the receiving VM's Rx port share the same VM-VM FIFO Queue (or otherwise the sending and receiving vNICs effect data transfers in a similar manner). Under one embodiment the FIFO Queues are operated in the conventional manner, except that rather than having a single software accessor, there are two software accessors. In one embodiment, data is added (via a memory Write) to the FIFO Queue at the current position of the Head pointer, while the Tail pointer is used to locate the last entry that has been Read. Adding an entry at the Head pointer overwrites the prior entry (i.e., existing data). Entries from the Tail pointer to the Head pointers have been written but have not been read, while entries from the Tail pointer+1 to the Head pointer have been read and thus may be overwritten.

Each FIFO entry comprises packet data 808 including a tag 810, a packet header 812, and payload data 814. The packet header and payload data correspond to the original packet data (being sent), while tag 810 is used for routing/forwarding purposes, and includes data for determining which packets are forwarded using a VM-to-VM cache fast path and which packets are forwarded using a vSwitch.

In one embodiment, the VM-VM FIFO Queues are implemented in L3 cache 610. In one embodiment, a given VM-VM FIFO Queue may be located at any contiguous address space in L3 cache 610 (i.e., as multiple cachelines having sequential addresses). In one embodiment, the VM-VM FIFO Queues are located in a portion of L3 cache 610 that is managed separately from the rest of the L3 cache. For example, L3 agent 710 may designate the cachelines VM-VM FIFO Queues to have retained data and/or otherwise have a separate eviction policy than the rest of the cachelines in the L3 cache. As with conventional L3 and LLC cache usage, each cacheline in the L3/LLC cache is associated with a corresponding cacheline in system memory. Accordingly, each VM-VM FIFO Queue occupies a corresponding address range in system memory, as depicted in FIG. 7.

Each packet corresponding to both internal (inter-VM) and external (received from external network, to be sent to external network) is tagged with VM session ID information. The VM session IDs are used to setup virtual network connections by associating network connections (i.e., TdCP/IP) with a given VM. The VQM uses the VM session ID information to determine whether to "keep" packets in the CPU cache (and thus effect VM-to-VM cache fast path forwarding) or use shared memory for traffic storage. The VQM hardware is responsible for controlling what data is kept in cache while concurrently coordinating data reads and writes to and from shared memory. The CPU Cache is used to buffer network traffic data that is to be read or transmitted to those VMs designated as cache fast-path VMs by the VQM. The VQM determines if the VM data is already in the CPU cache domain while concurrently coordinating with the data to and from the external shared memory. The VQM also ensures data coherency between data kept in cache and that which is kept in shared memory.

Figure 9:
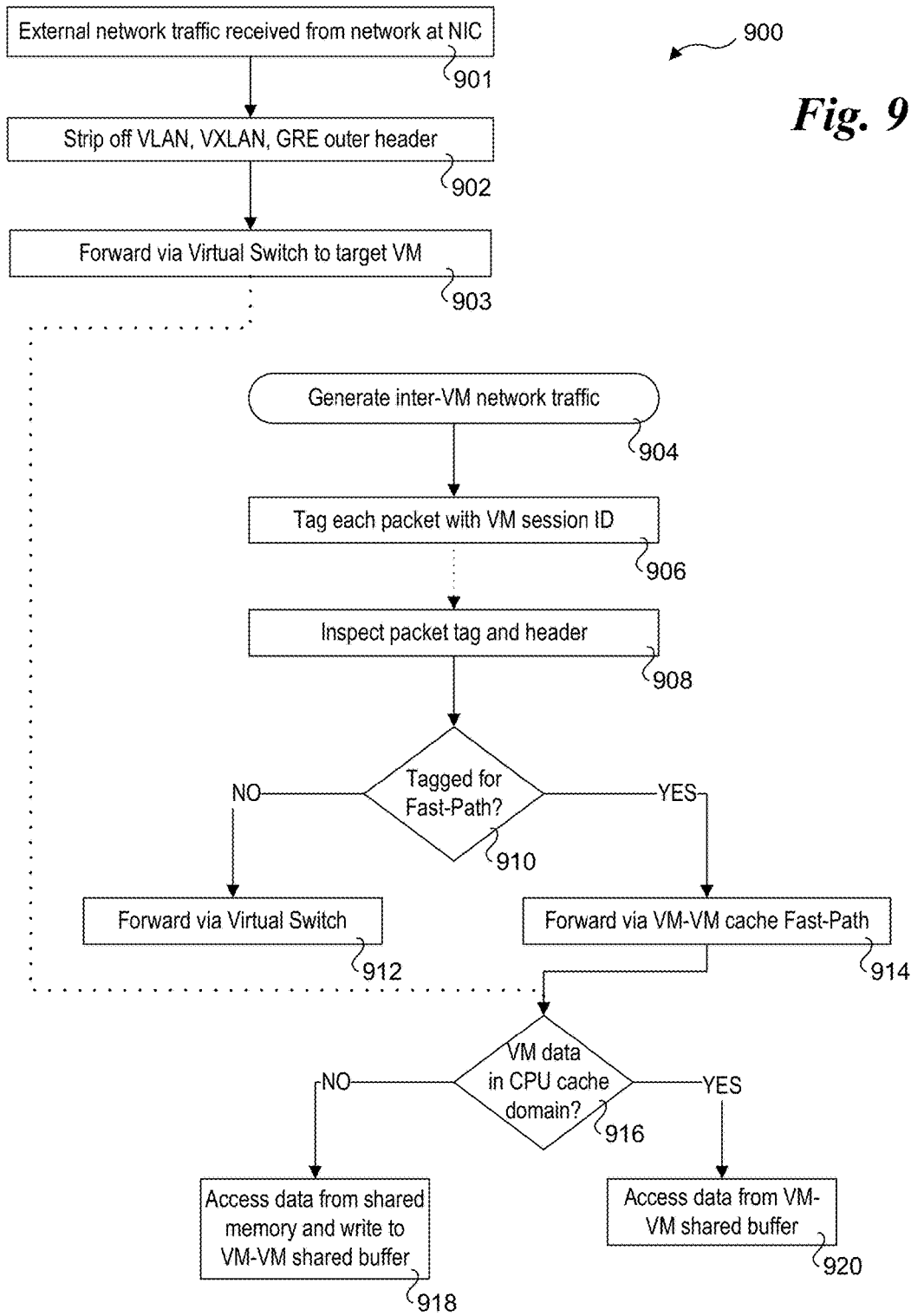
FIG. 9 is a flowchart 900 illustrating operations and logic for forwarding traffic using a combination of VM-VM cache fast path and virtual switch routing

FIG. 9 shows a flowchart 900 illustrating operations and logic for forwarding traffic using a combination of VM-VM cache fast path and virtual switch routing. The first portion of flowchart 900 including blocks 901, 902, and 903 relates to handling of external network traffic. In block 901, network traffic (e.g., a packet) is received from a network at a NIC or a packet is generated internally (by a VM) that has a network destination that is external to the host platform. The external network may employ an overlay network, such as a VLAN, VXLAN (Virtual Extensible Local Area Network), GRE (Generic Routing Encapsulation), etc., which uses an outer header containing information for forwarding packets via the overlay network. In block 902, the outer header of the packet is stripped off, and the packet is forwarded via a vSwitch to a target VM in block 903 (which subsequently includes the operations of a decision block 916 and blocks 918 and 920, as described below).

The remaining portion of flowchart 900 relates to handling of inter-VM network traffic on the host platform. In a start block 904, new packets comprising inter-VM network traffic are generated. In a block 906 a tag is added for each packet output from blocks 902 and 904 at an appropriate ingress point. For example, for data received from a network the ingress point may be the NIC and/or a flow classifier. For packets that are generated internal to the host, the virtual network ingress point may be a flow classifier or similar block in a network stack host by a VM.

Subsequently, as depicted by the dotted line extending down from block 906, the packet tag and header is inspected in a block 908 at a virtual network ingress point. As determined by a decision block 910, if the packet is not tagged for VM-VM cache fast path, the packet will be forwarded via a virtual switch, as depicted by a block 912. If the packet is tagged for VM-VM cache fast path, the packet will be forwarded via an appropriate VM-VM cache fast path, as depicted by a block 914. This will entail the operations of decision block 916 and blocks 918 and 920 (as applicable). As depicted by decision block 916, if the VM data for the packet is not in the CPU cache domain (meaning there is no valid copy of the cacheline containing the packet data in any cache level), the packet data will be read from system memory and written to the VM-VM shared buffer corresponding to the applicable VM-VM cache fast path used to forward the packet in a block 918. If the packet data is already in the CPU cache domain, there is a valid copy of the packet data in a cacheline at one of the cache levels and the packet is accessed from that cacheline, as depicted by a block 920.

Further aspects of the subject matter described herein are set out in the following numbered clauses:

1. A method performed on a host platform including a processor with one or more cores and a plurality of caches forming a cache hierarchy, the host platform running software including a hypervisor over which a plurality of virtual machines (VMs) are run, the method comprising:

forwarding a first portion of packetized traffic between VMs via one or more VM-to-VM cache fast paths.

2. The method of claim 1, wherein the host platform includes a virtual switch configured to forward packetized traffic between VMs, further comprising forwarding a second portion of packetized traffic between VMs using the virtual switch.

3. The method of claim 1 or 2, further comprising implementing a VM-to-VM cache fast path by:

allocating a VM-VM shared data buffer in a cache in the cache hierarchy, the VM-VM shared data buffer allocated for cache fast path data transfers between a first VM and a second VM;

buffering packetized data generated by the first VM to be transferred from the first VM to the second VM in the VM shared data buffer allocated for data transfers between the first and second VMs; and reading, by the second VM, the packetized data from the first VM-to-second VM shared data buffer.

4. The method of claim 3, wherein the host platform includes a virtual switch configured to forward packetized traffic between VMs, further comprising:

implementing a virtual queue manager (VQM) on the processor;

configuring the VQM with a plurality of VM-VM allow entries, each identifying a pair of VMs for which a cache fast path data transfer is allowed and having a corresponding VM-to-VM shared data buffer allocated in the cache;

receiving a packet from the first VM at the VQM, and inspecting the packet to identify the first VM and a second VM to which the packet is to be forwarded;

determining if there is a VM-VM allow entry for the first and second VMs; and if there is a VM-VM allow entry for the first and second VMs, writing packet data for the packet in the VM-to-VM shared data buffer allocated for the first and second VMs, otherwise forwarding the packet via the virtual switch.

5. The method of claim 4, further comprising writing the packet data from the VQM to the cache in which the VM-to-VM shared buffer is allocated via a direct memory access (DMA) path.

6. The method of claim 5, wherein the cache hierarchy includes a level 1 (L1) and level 2 (L2) cache for each of the plurality of cores and a last level cache (LLC), and the VM-to-VM shared data buffers is allocated in the LLC.

7. The method of claim 4, further comprising programming the VM-VM allow entries with a software defined networking controller.

8. The method of claim 4, further comprising:

writing the packet data for the packet to an L1 cache for a core on which the VM is running; and sending a copy of the packet data from the L1 cache to the VQM via a direct memory access (DMA) path, wherein the copy of the packet data that is sent corresponds to the packet received from the VM.

9. The method of claim 3, further comprising:

tagging packets with indicia indicating whether the packets are to be forwarded via a VM-to-VM cache fast path;

inspecting a tag for a packet; and forwarding the packet via a VM-to-VM cache fast path if indicia in the tag indicates the packet is to be forwarded via the VM-to-VM cache fast path, otherwise, forwarding the packet via the virtual switch.

10. The method of claim 9, wherein the host platform further includes a network interface card (NIC), and wherein packets are tagged at least one of:

external network traffic received from a network at the NIC;

network traffic generated by a VM to be sent to an external network via the NIC; and inter-VM network traffic.

12. A host platform including a processor with a plurality of cores and a plurality of caches forming a cache hierarchy, the processor operatively coupled to system memory, wherein the system memory and cache hierarchy are implemented as a coherent memory domain, the host platform having software stored thereon including a hypervisor over which a plurality of virtual machines (VMs) are run and a virtual switch configured to forward packetized traffic between VMs when the host platform is operating, wherein the host platform is configured, when operating, to:

forward a first portion of packetized traffic between VMs via one or more VM-to-VM cache fast paths; and forward a second portion of packetized traffic between VMs via the virtual switch.

13. The host platform of clause 12, wherein the host platform is further configured to:

allocate a VM-VM shared data buffer in a cache in the cache hierarchy, the VM-VM shared data buffer allocated for cache fast path data transfers between a first VM and a second VM;

buffer packetized data generated by the first VM to be transferred from the first VM to the second VM in the VM shared data buffer allocated for data transfers between the first and second VMs; and read, by the second VM, the packetized data from the first VM-to-second VM shared data buffer.

14. The host platform of clause 13, wherein the host platform is further configured to:

tag packets with indicia indicating whether the packets are to be forwarded via a VM-to-VM cache fast path;

inspect a tag for a packet; and forward the packet via a VM-to-VM cache fast path if indicia in the tag indicates the packet is to be forwarded via the VM-to-VM cache fast path, otherwise, forwarding the packet via the virtual switch.

15. The host platform of clause 14, wherein the indicia comprises a VM session ID.

16. The host platform of clause 14 or 15, wherein the host platform further includes a network interface card (NIC), and wherein packets are tagged for each of:
external network traffic received from a network at the NIC;
network traffic generated by a VM to be sent to an external network via the NIC; and
inter-VM network traffic.

17. The host platform of any of clauses 12-16, wherein the processor comprises:
a plurality of cores, each having an associated level 1 (L2) cache and a level 2 (L2) cache;
a last level cache (LLC), communicatively coupled to the plurality of cores;
a memory controller, communicatively coupled to the plurality of cores, configured to support access to the system memory; and
a virtual queue manager (VQM), communicatively coupled to the LLC;
wherein each of the L1 caches, L2 caches, and LLC include an associated cache agent and a plurality of cacheline slots for storing cacheline data, and wherein the processor is further configured, during operation of the host platform, to:
receive a packet at the VQM, the packet generated by a first VM and destined for a second VM;
inspect the packet to determine whether the packet should be forwarded via a VM-to-VM cache fast path; and
if the packet is to be forwarded via the VM-to-VM cache fast path, write packet data for the packet from the VQM to one or more cachelines in a VM-VM shared data buffer in the LLC allocated for cache fast path forwarding between the first VM and the second VM.

18. The host platform of clause 17, wherein the VQM is configured to store a plurality of VM-VM allow entries, each VM-VM allow entry identifying a pair of VMs between which cache fast path forwarding is allowed.

19. The host platform of clause 17 or 18, wherein each VM-VM allow entry contains information identify a location of a corresponding VM-VM shared data buffer in the LLC.

20. The host platform of any of clauses 17-19, wherein the packet is received from a VM, and wherein if it is determined the packet should not be forwarded via a VM-to-VM cache fast path, the VQM returns indicia to the VM indicating the packet will not be forwarded via a VM-to-VM cache fast path.

21. A processor, configured to be installed on a host platform including system memory, the processor comprising:
a plurality of cores, each having an associated level 1 (L2) cache and a level 2 (L2) cache;
a last level cache (LLC), communicatively coupled to the plurality of cores;
a memory controller, communicatively coupled to the plurality of cores, configured to support access to the system memory when the processor is installed in the computer system; and
a virtual queue manager (VQM), communicatively coupled to the LLC;
wherein each of the L1 caches, L2 caches, and LLC include a plurality of cacheline slots for storing cacheline data and an associated cache agent, wherein during operation the host platform is configured to execute, via the processor, software including a hypervisor and a plurality of VMs, execution of the software further implementing a virtual switch configured to forward packetized traffic between VMs, and wherein the processor is further configured, during operation of the host platform, to:
receive a packet at the VQM, the packet generated by a first VM and destined for a second VM;
inspect the packet to determine whether the packet should be forwarded via a VM-to-VM cache fast path; and
if the packet is to be forwarded via the VM-to-VM cache fast path, write packet data for the packet from the VQM to one or more cachelines in a VM-VM shared data buffer in the LLC allocated for cache fast path forwarding between the first VM and the second VM.

22. The processor of clause 21, wherein the VQM is configured to store a plurality of VM-VM allow entries, each VM-VM allow entry identifying a pair of VMs between which cache fast path forwarding is allowed.

23. The processor of clause 22, wherein each VM-VM allow entry contains information identify a location of a corresponding VM-VM shared data buffer in the LLC.

24. The processor of clause 23, further wherein the VQM is configured to be programmed with VM-VM allowed entries by a software component running on the host platform.

25. The processor of any of clauses 21-24, wherein the packet includes a tag containing a VM session ID, and the VQM inspects the VM session ID to determine whether to forward the packet via a VM-to-VM cache fast path.

26. The processor of any of clauses 21-25, wherein the packet is received from a VM, and wherein if it is determined the packet should not be forwarded via a VM-to-VM cache fast path, the VQM returns indicia to the VM indicating the packet will not be forwarded via a VM-to-VM cache fast path.

27. The processor of any of clauses 21-26, wherein the processor is further configured to:
allocate a VM-VM shared data buffer in a cache in the cache hierarchy, the VM-VM shared data buffer allocated for cache fast path data transfers between a first VM and a second VM;
buffer packetized data generated by the first VM to be transferred from the first VM to the second VM in the VM shared data buffer allocated for data transfers between the first and second VMs; and
enable the packetized data to be read from the first VM-to-second VM shared data buffer.

28. The processor of clause 27, wherein the processor is further configured to:
inspect a tag for a packet, the tag comprising indicia indicating whether the packets are to be forwarded via a VM-to-VM cache fast path; and
copy the packet to a VM-VM shared data buffer associated with the VM-to-VM cache fast path if indicia in the tag indicates the packet is to be forwarded via the VM-to-VM cache fast path.

29. The host platform of clause 28, wherein the indicia comprises a VM session ID.

30. A host platform including a processor with a plurality of cores and a plurality of caches forming a cache hierarchy, the processor operatively coupled to system memory, wherein the system memory and cache hierarchy are implemented as a coherent memory domain, the host platform having software stored thereon including a hypervisor over which a plurality of virtual machines (VMs) are run and a virtual switch configured to forward packetized traffic between VMs when the host platform is operating, wherein the host platform comprises means for:

forwarding a first portion of packetized traffic between VMs via one or more VM-to-VM cache fast paths; and forwarding a second portion of packetized traffic between VMs via the virtual switch.

31. The host platform of clause 30, wherein the host platform further comprises means for:

allocating a VM-VM shared data buffer in a cache in the cache hierarchy, the VM-VM shared data buffer allocated for cache fast path data transfers between a first VM and a second VM;

buffering packetized data generated by the first VM to be transferred from the first VM to the second VM in the VM shared data buffer allocated for data transfers between the first and second VMs; and reading, by the second VM, the packetized data from the first VM-to-second VM shared data buffer.

32. The host platform of clause 31, wherein the host platform further comprises means for:

tagging packets with indicia indicating whether the packets are to be forwarded via a VM-to-VM cache fast path;

inspecting a tag for a packet; and forwarding the packet via a VM-to-VM cache fast path if indicia in the tag indicates the packet is to be forwarded via the VM-to-VM cache fast path, otherwise, forwarding the packet via the virtual switch.

33. The host platform of clause 32, wherein the indicia comprises a VM session ID.

34. The host platform of any of clauses 30-33, wherein the processor comprises:

a plurality of cores, each having an associated level 1 (L2) cache and a level 2 (L2) cache;

a last level cache (LLC), communicatively coupled to the plurality of cores;

a memory controller, communicatively coupled to the plurality of cores, configured to support access to the system memory; and a virtual queue manager (VQM), communicatively coupled to the LLC;

wherein each of the L1 caches, L2 caches, and LLC include an associated cache agent and a plurality of cacheline slots for storing cacheline data, and wherein the processor further includes means for:

receiving a packet at the VQM, the packet generated by a first VM and destined for a second VM;

inspecting the packet to determine whether the packet should be forwarded via a VM-to-VM cache fast path; and if the packet is to be forwarded via the VM-to-VM cache fast path, writing packet data for the packet from the VQM to one or more cachelines in a VM-VM shared data buffer in the LLC allocated for cache fast path forwarding between the first VM and the second VM.

35. The host platform of clause 34, wherein the VQM is configured to store a plurality of VM-VM allow entries, each VM-VM allow entry identifying a pair of VMs between which cache fast path forwarding is allowed.

36. The host platform of clause 34 or 15, wherein each VM-VM allow entry contains information identify a location of a corresponding VM-VM shared data buffer in the LLC.

37. The host platform of any of clauses 34-36, wherein the packet is received from a VM, and wherein if it is determined the packet should not be forwarded via a VM-to-VM cache fast path, the VQM returns indicia to the VM indicating the packet will not be forwarded via a VM-to-VM cache fast path.

38. A processor, configured to be installed on a host platform including system memory, the processor comprising:

a plurality of cores, each having an associated level 1 (L2) cache and a level 2 (L2) cache;

a last level cache (LLC), communicatively coupled to the plurality of cores;

a memory controller, communicatively coupled to the plurality of cores, configured to support access to the system memory when the processor is installed in the computer system; and a virtual queue manager (VQM), communicatively coupled to the LLC;

wherein each of the L1 caches, L2 caches, and LLC include a plurality of cacheline slots for storing cacheline data and an associated cache agent, wherein during operation the host platform is configured to execute, via the processor, software including a hypervisor and a plurality of VMs, execution of the software further implementing a virtual switch configured to forward packetized traffic between VMs, and wherein the processor further comprises means for:

receiving a packet at the VQM, the packet generated by a first VM and destined for a second VM;

inspecting the packet to determine whether the packet should be forwarded via a VM-to-VM cache fast path; and if the packet is to be forwarded via the VM-to-VM cache fast path, writing packet data for the packet from the VQM to one or more cachelines in a VM-VM shared data buffer in the LLC allocated for cache fast path forwarding between the first VM and the second VM.

39. The processor of clause 38, wherein the VQM includes means for storing a plurality of VM-VM allow entries, each VM-VM allow entry identifying a pair of VMs between which cache fast path forwarding is allowed.

40. The processor of clause 39, wherein each VM-VM allow entry contains information identify a location of a corresponding VM-VM shared data buffer in the LLC.

41. The processor of clause 40, further wherein the VQM includes means for enabling VM-VM allowed entries to be programmed by a software component running on the host platform.

42. The processor of any of clauses 38-41, wherein the packet includes a tag containing a VM session ID, and the VQM inspects the VM session ID to determine whether to forward the packet via a VM-to-VM cache fast path.

43. The processor of any of clauses 38-42, wherein the packet is received from a VM, and wherein if it is determined the packet should not be forwarded via a VM-to-VM cache fast path, the VQM returns indicia to the VM indicating the packet will not be forwarded via a VM-to-VM cache fast path.

44. The processor of any of clauses 38-43, wherein the processor further comprises means for:

allocating a VM-VM shared data buffer in a cache in the cache hierarchy, the VM-VM shared data buffer allocated for cache fast path data transfers between a first VM and a second VM;

buffering packetized data generated by the first VM to be transferred from the first VM to the second VM in the VM shared data buffer allocated for data transfers between the first and second VMs; and enabling the packetized data to be read from the first VM-to-second VM shared data buffer.

45. The processor of clause 44, wherein the processor further comprises means for:

inspecting a tag for a packet, the tag comprising indicia indicating whether the packets are to be forwarded via a VM-to-VM cache fast path; and copying the packet to a VM-VM shared data buffer associated with the VM-to-VM cache fast path if indicia in the tag indicates the packet is to be forwarded via the VM-to-VM cache fast path.

Although some embodiments have been described in reference to particular implementations, other implementations are possible according to some embodiments. Additionally, the arrangement and/or order of elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Italicized letters, such as 'i', 'j', 'l', 'm', 'n', 'p', etc. in the foregoing detailed description are used to depict an integer number, and the use of a particular letter is not limited to particular embodiments. Moreover, the same letter may be used in separate claims to represent separate integer numbers, or different letters may be used. In addition, use of a particular letter in the detailed description may or may not match the letter used in a claim that pertains to the same subject matter in the detailed description.

As discussed above, various aspects of the embodiments herein may be facilitated by corresponding software and/or firmware components and applications, such as software and/or firmware executed by an embedded processor or the like. Thus, embodiments of this invention may be used as or to support a software program, software modules, firmware, and/or distributed software executed upon some form of processor, processing core or embedded logic a virtual machine running on a processor or core or otherwise implemented or realized upon or within a computer-readable or machine-readable non-transitory storage medium. A computer-readable or machine-readable non-transitory storage medium includes any mechanism for storing or transmitting information in a form readable by a machine (e.g., a computer). For example, a computer-readable or machine-readable non-transitory storage medium includes any mechanism that provides (i.e., stores and/or transmits) information in a form accessible by a computer or computing machine (e.g., computing device, electronic system, etc.), such as recordable/non-recordable media (e.g., read only memory (ROM), random access memory (RAM), magnetic disk storage media, optical storage media, flash memory devices, etc.). The content may be directly executable ("object" or "executable" form), source code, or difference code ("delta" or "patch" code). A computer-readable or machine-readable non-transitory storage medium may also include a storage or database from which content can be downloaded. The computer-readable or machine-readable non-transitory storage medium may also include a device or product having content stored thereon at a time of sale or delivery. Thus, delivering a device with stored content, or offering content for download over a communication medium may be understood as providing an article of manufacture comprising a computer-readable or machine-readable non-transitory storage medium with such content described herein.

Various components referred to above as processes, servers, or tools described herein may be a means for performing the functions described. The operations and functions performed by various components described herein may be implemented by software running on a processing element, via embedded hardware or the like, or any combination of hardware and software. Such components may be implemented as software modules, hardware modules, special-purpose hardware (e.g., application specific hardware, ASICs, DSPs, etc.), embedded controllers, hardwired circuitry, hardware logic, etc. Software content (e.g., data, instructions, configuration information, etc.) may be provided via an article of manufacture including computer-readable or machine-readable non-transitory storage medium, which provides content that represents instructions that can be executed. The content may result in a computer performing various functions/operations described herein.

As used herein, a list of items joined by the term "at least one of" can mean any combination of the listed terms. For example, the phrase "at least one of A, B or C" can mean A; B; C; A and B; A and C; B and C; or A, B and C.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. A method performed on a host platform including a processor with one or more cores and a plurality of caches forming a cache hierarchy, the host platform running software including a hypervisor over which a plurality of virtual machines (VMs) are run and including a virtual switch configured to forward packetized traffic between VMs, the method comprising:
   forwarding a first portion of packetized traffic between VMs via one or more VM-to-VM cache fast paths; and
   forwarding a second portion of packetized traffic between VMs using the virtual switch,
   wherein a VM-to-VM cache fast path is implemented by,
      allocating a VM-VM shared data buffer in a cache in the cache hierarchy, the VM-VM shared data buffer allocated for cache fast path data transfers between a first VM and a second VM;
      buffering packetized data generated by the first VM to be transferred from the first VM to the second VM in the VM-VM shared data buffer allocated for data transfers between the first and second VMs; and
      reading, by the second VM, the packetized data from the VM-VM shared data buffer.

2. The method of claim 1, wherein the host platform includes a virtual switch configured to forward packetized traffic between VMs, further comprising:
   implementing a virtual queue manager (VQM) on the processor;
   configuring the VQM with a plurality of VM-VM allow entries, each identifying a pair of VMs for which a cache fast path data transfer is allowed and having a corresponding VM-VM shared data buffer allocated in the cache;
   receiving a packet from the first VM at the VQM, and inspecting the packet to identify the first VM and a second VM to which the packet is to be forwarded;
   determining if there is a VM-VM allow entry for the first and second VMs; and
   if there is a VM-VM allow entry for the first and second VMs, writing packet data for the packet in the VM-VM shared data buffer allocated for the first and second VMs, otherwise forwarding the packet via the virtual switch.

3. The method of claim 2, further comprising writing the packet data from the VQM to the cache in which the VM-VM shared buffer is allocated via a direct memory access (DMA) path.

4. The method of claim 3, wherein the cache hierarchy includes a level 1 (L1) and level 2 (L2) cache for each of the plurality of cores and a last level cache (LLC), and the VM-VM shared data buffers is allocated in the LLC.

5. The method of claim 2, further comprising programming the VM-VM allow entries with a software defined networking controller.

6. The method of claim 2, further comprising:
   writing the packet data for the packet to an L1 cache for a core on which the VM is running; and
   sending a copy of the packet data from the L1 cache to the VQM via a direct memory access (DMA) path,
   wherein the copy of the packet data that is sent corresponds to the packet received from the VM.

7. The method of claim 1, further comprising:
   tagging packets with indicia indicating whether the packets are to be forwarded via a VM-to-VM cache fast path;
   inspecting a tag for a packet; and
   forwarding the packet via a VM-to-VM cache fast path if indicia in the tag indicates the packet is to be forwarded via the VM-to-VM cache fast path,
   otherwise, forwarding the packet via the virtual switch.

8. The method of claim 7, wherein the host platform further includes a network interface card (NIC), and wherein packets are tagged at least one of:
   external network traffic received from a network at the NIC;
   network traffic generated by a VM to be sent to an external network via the NIC; and
   inter-VM network traffic.

9. A host platform including a processor with a plurality of cores and a plurality of caches forming a cache hierarchy, the processor operatively coupled to system memory, wherein the system memory and cache hierarchy are implemented as a coherent memory domain, the host platform having software stored thereon including a hypervisor over which a plurality of virtual machines (VMs) are run and a virtual switch configured to forward packetized traffic between VMs when the host platform is operating, wherein the host platform is configured, when operating, to:
   forward a first portion of packetized traffic between VMs via one or more VM-to-VM cache fast paths;
   forward a second portion of packetized traffic between VMs via the virtual switch; and
   implement a VM-to-VM cache fast path by,
      allocating a VM-VM shared data buffer in a cache in the cache hierarchy, the VM-VM shared data buffer allocated for cache fast path data transfers between a first VM and a second VM;
      buffering packetized data generated by the first VM to be transferred from the first VM to the second VM in the VM-VM shared data buffer allocated for data transfers between the first and second VMs; and
      reading, by the second VM, the packetized data from the VM-VM shared data buffer.

10. The host platform of claim 9, wherein the host platform is further configured to:
    tag packets with indicia indicating whether the packets are to be forwarded via a VM-to-VM cache fast path;
    inspect a tag for a packet; and forward the packet via a VM-to-VM cache fast path if indicia in the tag indicates the packet is to be forwarded via the VM-to-VM cache fast path, otherwise, forwarding the packet via the virtual switch.

11. The host platform of claim 10, wherein the indicia comprises a VM session ID.

12. The host platform of claim 10, wherein the host platform further includes a network interface card (NIC), and wherein packets are tagged for each of:

external network traffic received from a network at the NIC;

network traffic generated by a VM to be sent to an external network via the NIC; and inter-VM network traffic.

13. The host platform of claim 9, wherein the processor comprises:

a plurality of cores, each having an associated level 1 (L2) cache and a level 2 (L2) cache;

a last level cache (LLC), communicatively coupled to the plurality of cores;

a memory controller, communicatively coupled to the plurality of cores, configured to support access to the system memory; and a virtual queue manager (VQM), communicatively coupled to the LLC;

wherein each of the L1 caches, L2 caches, and LLC include an associated cache agent and a plurality of cacheline slots for storing cacheline data, and wherein the processor is further configured, during operation of the host platform, to:

receive a packet at the VQM, the packet generated by a first VM and destined for a second VM;

inspect the packet to determine whether to forward the packet via a VM-to-VM cache fast path; and if the packet is to be forwarded via the VM-to-VM cache fast path, write packet data for the packet from the VQM to one or more cachelines in a VM-VM shared data buffer in the LLC allocated for cache fast path forwarding between the first VM and the second VM.

14. The host platform of claim 13, wherein the VQM is configured to store a plurality of VM-VM allow entries, each VM-VM allow entry identifying a pair of VMs between which cache fast path forwarding is allowed.

15. The host platform of claim 13, wherein each VM-VM allow entry contains information identify a location of a corresponding VM-VM shared data buffer in the LLC.

16. The host platform of claim 13, wherein the packet is received from a VM, and wherein if it is determined the packet is not to be forwarded via a VM-to-VM cache fast path, the VQM returns indicia to the VM indicating the packet will not be forwarded via a VM-to-VM cache fast path.

17. A processor, configured to be installed on a host platform including system memory, the processor comprising:

a plurality of cores, each having an associated level 1 (L2) cache and a level 2 (L2) cache;

a last level cache (LLC), communicatively coupled to the plurality of cores;

a memory controller, communicatively coupled to the plurality of cores, configured to support access to the system memory when the processor is installed in the computer system; and a virtual queue manager (VQM), communicatively coupled to the LLC;

wherein each of the L1 caches, L2 caches, and LLC include a plurality of cacheline slots for storing cacheline data and an associated cache agent, wherein during operation the host platform is configured to execute, via the processor, software including a hypervisor and a plurality of VMs, execution of the software further implementing a virtual switch configured to forward packetized traffic between VMs, and wherein the processor is further configured, during operation of the host platform, to:

receive a packet at the VQM, the packet generated by a first VM and destined for a second VM;

inspect the packet to determine whether to forward the packet via a VM-to-VM cache fast path; and if the packet is to be forwarded via the VM-to-VM cache fast path, write packet data for the packet from the VQM to one or more cachelines in a VM-VM shared data buffer in the LLC allocated for cache fast path forwarding between the first VM and the second VM.

18. The processor of claim 17, wherein the VQM is configured to store a plurality of VM-VM allow entries, each VM-VM allow entry identifying a pair of VMs between which cache fast path forwarding is allowed.

19. The processor of claim 18, wherein each VM-VM allow entry contains information identify a location of a corresponding VM-VM shared data buffer in the LLC.

20. The processor of claim 19, further wherein the VQM is configured to be programmed with VM-VM allowed entries by a software component running on the host platform.

21. The processor of claim 17, wherein the packet includes a tag containing a VM session ID, and the VQM inspects the VM session ID to determine whether to forward the packet via a VM-to-VM cache fast path.

22. The processor of claim 17, wherein the packet is received from VM, and wherein if it is determined the packet is not to be forwarded via a VM-to-VM cache fast path, the VQM returns indicia to the VM indicating the packet will not be forwarded via a VM-to-VM cache fast path.

* * * * *